United States Patent [19]

Roberts et al.

[11] 4,374,879

[45] Feb. 22, 1983

[54] GLASS BOTTLE COATING COMPOSITION MADE FROM A SALT OF A POLYAMINE TERMINATED POLYEPOXIDE ADDUCT, AN EPOXY CROSSLINKER, A REACTIVE SILANE, A SURFACTANT AND A NATURAL OR SYNTHETIC WAX

[75] Inventors: Donald R. Roberts, Crestwood, Ky.; Gina R. Kritchevsky, both of Scotch Plains; Martin J. Hannon, Madison, both of N.J.

[73] Assignee: Celanese Corporation, New York, N.Y.

[21] Appl. No.: 230,976

[22] Filed: Feb. 2, 1981

[51] Int. Cl.³ .......................... C08L 63/00; B65D 1/02
[52] U.S. Cl. ............................ 428/35; 215/DIG. 6; 428/417; 523/404; 524/276
[58] Field of Search .................... 260/28 R, 29.2 EP; 523/414, 420, 404; 524/276; 428/35; 215/12 R, DIG. 6

[56] References Cited

U.S. PATENT DOCUMENTS

| | | | |
|---|---|---|---|
| 2,909,448 | 10/1959 | Schroeder | 117/141 |
| 3,169,884 | 3/1959 | Marzocchi et al. | 117/126 |
| 3,297,186 | 7/1962 | Wells | 215/100 |
| 3,323,889 | 3/1964 | Carl et al. | 65/60 |
| 3,336,253 | 8/1967 | Wong et al. | 260/29.2 |
| 3,368,915 | 3/1964 | Carl et al. | 117/72 |
| 3,449,281 | 6/1969 | Sullivan et al. | 260/292 |
| 3,667,926 | 6/1972 | Green et al. | 65/60 |
| 3,873,352 | 3/1975 | Kitaj | 117/124 E |
| 4,049,861 | 9/1977 | Nozari | 428/220 |
| 4,056,208 | 11/1977 | Prejean | 215/12 R |
| 4,069,368 | 1/1978 | Deyak et al. | 428/447 |
| 4,081,421 | 3/1978 | Yoshida et al. | 260/32.8 EP |
| 4,224,365 | 9/1980 | Ali-Zaidi | 428/35 |
| 4,250,068 | 2/1981 | Ali-Zaidi | 260/28.5 R |

*Primary Examiner*—Theodore E. Pertilla
*Attorney, Agent, or Firm*—Herbert P. Price

[57] ABSTRACT

The present invention is directed to a thermosetting coating composition for improving the scratch resistance, blush resistance, and lubricity of glass surfaces (e.g., glass bottles), and in certain instances also improving the label adhesion of coatings derived therefrom which comprises as functional ingredients a polyamine terminated polyepoxide adduct salt, an epoxy crosslinker, a reactive silane, a surfactant, and a natural or synthetic wax. The coating composition is carried in a vehicle which comprises water and a suitable co-solvent. The combination of the adduct salt and co-solvent permits the microemulsification of the epoxy crosslinker. The wax is also present in the emulsified state.

8 Claims, No Drawings

GLASS BOTTLE COATING COMPOSITION MADE FROM A SALT OF A POLYAMINE TERMINATED POLYEPOXIDE ADDUCT, AN EPOXY CROSSLINKER, A REACTIVE SILANE, A SURFACTANT AND A NATURAL OR SYNTHETIC WAX

BACKGROUND OF THE INVENTION

1. Field of the Invention

The present invention relates to compositions and methods of using the same for treating glass surfaces, such as glass containers, to improve their scratch resistance and lubricity while preferably preserving or improving other desirable properties in the resulting coating.

2. Description of the Prior Art

In the prior art, coatings have been applied to vitreous surfaces for various purposes. Such purposes include promoting adhesion between a vitreous surface and another substance, coloring the vitreous surface, controlling reflectance thereof, increasing electrical conductivity over the vitreous surface, increasing strength and durability of articles having such surfaces and increasing abrasion and scratch resistance of the surface.

The aforenoted vitreous surfaces are provided in a variety of configurations such as fibers, sheets, bottles and the like and the specific properties of the coating will in part be dictated and controlled by the particular configuration of the vitreous surface.

It is well known in the art that glass derives its strength from an unblemished surface and any scratches or flaws which are present on the surface decrease the strength of the glass many fold. Glass articles such as jars, bottles and tumblers possess their maximum strength shortly after they are formed. Their strength rapidly diminishes when they are subjected to abrasive contact in the course of handling, filling, packaging and shipping.

This problem is particularly acute when glass containers are used by processors of foods and beverages, because the glass containers are subjected to a number of processing operations wherein they are successively washed, filled, closed and packaged for delivery. In spite of precautions taken to minimize scratching and abusive handling, the many washing, sterilizing and other operations to which such containers are subjected cause the glass to be rubbed or otherwise contacted in various ways, often under high pressure, which can cause scratching. The glass containers repeatedly come into contact with each other as they move from station to station and as they are handled in the various operations. Breakage of the glass containers can cause a substantial increase in production costs, particularly if the breakage occurs after the containers have been filled.

Attempts to minimize the formation of defects in newly formed glass articles have included modification of the handling equipment and the application of various coatings to the newly-formed articles. While some coatings have resulted in a reduction in the number of defects, the coatings have created other problems such as discoloring of the glass or other changes in the appearance thereof, difficulty of application of the coatings, or lack of durability through washing and steam cleaning operations. In addition, many coatings were not acceptable for glassware because they were not approved for use with food or because labels did not tightly adhere to the coated surfaces.

Some of the compositions previously used as a protective coating for glass include tin and titanium compounds such as titanium and stannic halides and alkyl titanates which are sprayed on the surface of the glass at a temperature of from 900° F. to 1200° F. whereby said compounds react to form $TiO_2$ or $SnO_2$. The oxide layer is tightly adhered to the surface of the glass and thereafter the glass is cooled to about 450° F. or lower and a second coating is applied consisting of polyethylene, as described in U.S. Pat. Nos. 3,323,889; 3,368,915 and 3,667,926. These coatings involve two separate applications, one at the hot end of the annealing lehr and another at the cold end of the lehr.

Bottle manufacturers have expressed a need to change coating systems employing tin oxide due to the expense of applying coatings in two separate applications and the problems associated with stannic halides. More specifically, stannic halides hydrolyze in the presence of water to form hydrochloric acid which corrodes metal equipment. This makes it necessary for bottle manufactureres to replace various line and plant components on a routine basis.

One attempt to circumvent the above problem is illustrated in U.S. Pat. No. 3,873,352 which is directed to glass articles coated with an aqueous composition containing a silane, such as polyethyleneiminepropyltrimethoxysilane or an ethylenediaminopropyltrialkoxysilane, and an aqueous emulsion of an olefin such as polyethylene. While good abrasion resistance and labelability are alleged for this coating the adhesion of the same to the bottle when subjected to an aqueous wash, and particularly an aqueous caustic wash, is too low for certain applications.

Thus, while coating compositions may impart good initial scratch resistant properties to glass containers, these properties would be considerably reduced, if not lost altogether, should the coating be delaminated in whole or in part when the treated glass surface is wetted by water or steam, during a processing cycle. For example, glass containers for beer are subjected to hot caustic washes prior to being filled and the danger of delamination is increased substantially.

Thus, the search for a suitable protective glass bottle coating has been further complicated by the combination of properties which the same should possess in order for it to be a commercially acceptable alternative. For example, not only should a suitable protective coating exhibit good scratch resistance, lubricity, adhesion to the bottle, and water resistance, but it should also be capable of providing a surface to which common label adhesives can be applied and adhered to. The coated surface should also be clear and remain clear after processing.

Silane containing epoxy compositions used as protective coatings for materials, such as for example glass fiber, are disclosed in U.S. Pat. Nos. 3,169,884; 3,211,784; 3,297,186; 4,049,861; 4,069,386; and 4,081,421. However, none of the above patents employ in the coating formulations described therein waxes, surfactants or the specific type of amine terminated epoxy formualtions described herein.

Water dispersible epoxy compositions are disclosed in U.S. Pat. Nos. 3,336,253; and 3,449,281 as well as commonly assigned U.S. Patent Application Ser. No. 069,969, filed Aug. 27, 1979 entitled "Two Component Aqueous Based Can Coating Composition" by D.

Shimp, D. Hicks, and R. Graver the disclosure of which application is herein incorporated by reference. None of these two patents and applications show the use of said formulations to coat glass bottles and the like and the compositions described therein do not possess the combination of properties obtainable from the specific formulations described herein when used as a coating on glass bottles.

U.S. Pat. No. 4,056,208 is directed to caustic-resistant coatings of glass which comprise a primer layer of an epoxy resin and an organo functional silane (which can be applied as a dispersion), and a top coat of an ionic copolymer of alpha-olefins and alpha, beta-ethylenically unsaturated carboxylic acids. The presence of the top coat negates the need to develop properties such as label adhesion, scratch resistance and lubricity in the primer coat and the latter is used only to provide a means for increasing the adhesion of the top coat to the glass via the primer coat.

The search has therefore continued for bottle coating formulations which possess the aforedescribed desired properties. The present invention is a result of this search.

It is therefore an object of the present invention to provide an aqueous based coating composition which exhibits improved and durable adhesion to glass surfaces and renders the same highly resistant to scratches, while simultaneously maintaining or improving the strength characteristics of the glass.

It is another object of the present invention to provide an aqueous based coating composition which yields a coating having improved scratch resistance, lubricity, quick set time, blush resistance, and label adhesion when applied to glass surfaces.

It is another object of the present invention to provide a method for forming scratch resistant coatings on glass surfaces while avoiding the shortcomings of the methods and compositions known and used in the past in attempting to form such scratch resistant coatings.

It is still another object of the present invention to provide a method for coating glass containers to improve their scratch resistance, and lubricity and yet provide the adhesion of conventional label adhesives thereto.

Still another object of the present invention is to provide a method for coating a glass surface, such as the exterior of a glass container, so as to impart thereto at least improved dry and wet scratch resisting properties, thus permitting the container to undergo normal handling, processing, and shipping, with the consequent rubbing of the glass surface with other surfaces, without materially decreasing the strength of the container.

A further object of the present invention is to provide an article of manufacture having a glass surface and, on said surface having a tightly adhering, thin, preferably transparent coating which coating imparts at least superior wet and dry scratch resisting properties to the glass surface, said coating being highly blush resistant.

Still another object of the present invention is to provide glassware having a tightly adhering, thin, substantially colorless and transparent coating on its surface, which coating imparts increased strength and resistance to the ware, enabling it to withstand greater internal pressures without breakage.

A further object of the present invention is to provide glassware having a thin, substantially colorless and preferably transparent coating on its surface which coating is insoluble in water, is free from taste and odor, and is nontoxic, so as to permit the ware to be safely used for food and beverages.

These and other objects and features of the invention will become apparent from the claims and from the following description.

SUMMARY OF THE INVENTION

In one aspect of the present invention there is provided a three component curable coating composition capable of providing a scratch resistant, blush resistant, and lubricious coating on glass surfaces. More specifically, the first component comprises the solution of (1) an acid salt of a polyamine terminated polyepoxide adduct which is the reaction product of (a) a polyepoxide resin represented by the structural formula:

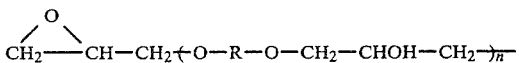

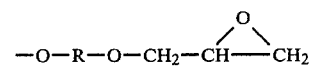

wherein R is a divalent hydrocarbon radical of a dihydric phenol and the average value of n is from about 2 to about 35 and (b) a polyamine having at least two amine nitrogen atoms per molecule, at least three reactive amine hydrogen atoms per molecule and no other groups reactive with epoxide groups, wherein about 1 mol of (b) is reacted with each epoxide equivalent of (a), said adduct having an active amine hydrogen equivalent weight of about 140 to about 1700 and an amine nitrogen equivalent weight of about 140 to about 2600; (2) at least one organic aliphatic hydroxyl containing co-solvent having a solubility parameter polar component between about 2.6 and about 3.9 $(cal/cm^3)^{\frac{1}{2}}$ present in an amount of from about 5 to about 45% by weight based on the weight of the polyepoxide-amine adduct and co-solvent; and (3) water in an amount sufficient to bring the solids content of the mixture to below 40% by weight, based on the weight of adduct, co-solvent and water.

The second component comprises the mixture of: (1) at least one polyepoxide crosslinker which is the glycidyl polyether of a polyhydric phenol having an epoxide equivalent weight of from about 150 to about 1000; (2) at least one silane represented by the structural formula:

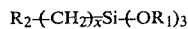

wherein $R_1$ is an alkyl group of from about 1 to about 4 carbons; $R_2$ is an organo functional radical selected from the group consisting of amino, glycidyl, epoxy cycloaliphatic wherein the cycloaliphatic group contains from about 5 to about 7 carbons, mercapto, ureido, amino alkylimino wherein the alkyl group contains from about 1 to about 6 carbons; and x is an integer of from about 2 to about 5; (3) at least one surface active agent selected from the group consisting of anionic, non-ionic and cationic characterized by their compatibility with the mixed components of the system; and (4) optionally at least one co-solvent of the type employed in the first component in an amount of from about 0 to about 90%, by weight based on the weight of the co-solvent and crosslinker.

The third component comprises an aqueous emulsion of at least one system compatible natural or synthetic wax emulsified in water with at least one system compatible surfactant of the type employed in the second component, said surfactant and water being present in the third component in at least an amount sufficient to emulsify said wax.

The amounts of the aforenoted polyepoxide crosslinker, silane, surfactant and wax in each of their respective components is such that when the three components are combined the solids content of the resulting mixture contains (i) the polyepoxide crosslinker in an amount sufficient to achieve an epoxy crosslinker to reactive adduct amine hydrogen equivalent weight ratio of from about 0.25:1.0 to about 1.5:1.0, (ii) the silane in an amount of from about 0.5 to about 10%, by weight, based on the weight of said solids content; (iii) the wax in an amount of from about 1 to about 50%, by weight, based on the weight of said solids content; and (iiii) the surface active agent in an amount of from about 1 to about 10%, by weight, based on the weight of said solids content.

When the first and second components are combined, the epoxy crosslinker is dispersed in the microemulsified state with the aid of the co-solvent and salted adduct. When the resulting microemulsion containing mixture is added to the third component the emulsified wax particles are mixed with the microemulsified epoxy crosslinker particles and the discontinuous phase of the resulting emulsion is heterogeneous in nature, it being a mixture of two different but compatible types of emulsified particles.

Thus, another aspect of the present invention provides a coating composition wherein the three aforedescribed components are mixed together.

Another aspect of the present invention is directed to a process for improving the scratch resistance, and lubricity of glass containers by applying the aforedescribed mixed composition which is blush resistant as a coating to the external surface of said glass containers and then curing the same by heating the coating to a temperature of not greater than about 250° F.

In another aspect of the present invention, there is provided an article of manufacture which comprises a glass container coated on its external surface with a cured composition which renders the glass surface scratch resistant and lubricious, said cured composition being derived from the aforedescribed coating composition.

Still another aspect of the present invention is directed to a coating composition which is capable of providing a scratch resistant, lubricious, blush resistant coating on glass surfaces said coating also exhibiting adhesion of labels to the same. More specifically, in this aspect of the present invention the aforenoted coating compositions employ a partially oxidized polyethylene as the aforedescribed wax, said polyethylene having a number average molecular weight of less than about 20,000, a density of greater than about 0.95 gm/cc and an acid number of from about 14 to about 18.

DESCRIPTION OF THE PREFERRED EMBODIMENTS

First Component

The polyamine terminated polyepoxide adduct of the first component of the coating composition is the reaction product of a polyamine with a polyepoxide resin.

The polyamines which are reacted with the polyepoxide resins contain at least 2 amine nitrogen atoms per molecule, at least 3 amine hydrogen atoms per molecule and no other groups which are reactive with epoxide groups. These polyamines can be aliphatic or cycloaliphatic and contain at least 2 carbon atoms per molecule. Useful polyamines contain about 2 to about 6 amine nitrogen atoms, 3 to about 8 amine hydrogen atoms, and 2 to about 20 carbon atoms per molecule. Examples of such amines are the alkylene polyamines, such as ethylene diamine, 1,2-propylene diamine, 1,3-propylene diamine, 1,2-butylene diamine, 1,3-butylene diamine, 1,4-butylene diamine, 1,5-pentalene diamine, 1,6-hexylene diamine, 1,4-diaminocyclohexane, methyl-aminopropylamine, and the like. Preferred amines for use in this invention are alkylene polyamines of the formula:

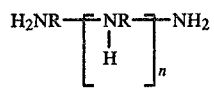

wherein n is an integer of 0 to 4 and R is an alkylene group containing 2 to 4 carbon atoms. Examples of such alkylene polyamines are ethylene diamine, diethylene triamine, triethylene tetramine, tetraethylene pentamine, pentaethylene hexamine, dipropylene triamine, tributylene tetramine and the like. Mixtures of amines can also be used. The more preferred amines are the ethylene polyamines with the most preferred being ethylene diamine, diethylene triamine and triethylene tetramine.

The polyepoxide resins useful in preparing the adduct include glycidyl polyethers of polyhydric phenols and contain more than one 1,2-epoxide groups per molecule. Such polyepoxide resins are derived from an epihalohydrin and a dihydric phenol and have an epoxide equivalent weight of about 1500 to about 2500, preferably from about 1700 to about 2200. Examples of epihalohydrins are epichlorohydrin, epibromohydrin and epiiodohydrin with epichlorohydrin being preferred. Dihydric phenols are exemplified by resorcinol, hydroquinone, p,p-dihydroxydiphenylpropane (or Bisphenol A as it is commonly called), p,p'-dihydroxybenzophenone, p,p'-dihydroxydiphenyl methane, p,p'-dihydroxydiphenylethane, bis(2-hydroxynaphthyl)methane, 1,5-dihydroxynaphthylene and the like with Bisphenol A being preferred. These polyepoxide resins are well known in the art and are made in desired molecular weights by reacting the epihalohydrin and the dihydric phenol in various ratios or by reacting a dihydric phenol with a lower molecular weight polyepoxide. The polyepoxide resins can be represented by the general formula:

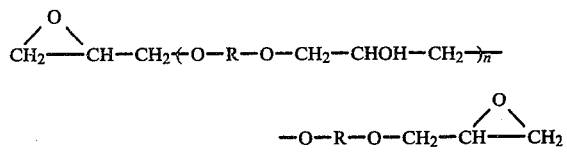

wherein R is a divalent hydrocarbon radical of a dihydric phenol and n is an integer. While for any single molecule of the polyether, n is an integer, the obtained polyether is a mixture of compounds and the determined value for n constitutes an average which is not necessarily a whole number. Thus, the average value of n of the polyepoxide employed to prepare the adduct is not less than 2 and can vary from about 2 to about 35, and preferably from about 4.5 to about 6.5.

If the average value for n is less than about 2 (i.e., the WPE is less than about 550) the chemical stability (pot life) of the microemulsion which forms upon mixing components 1 and 2 is substantially reduced. However, if the value of n is greater than about 21 (i.e., the WPE is greater than about 3150) preparation of the epoxy-amine adduct becomes increasingly difficult. In view of the above, it is preferable that the proper balance between chemical stability and cost efficient preparation be achieved by controlling the WPE of the polyepoxide used to prepare the adduct to be between about 550 and about 2500, preferably from about 850 to about 1100 which corresponds generally to the aforedescribed n values.

The resulting adduct of the polyamine and polyepoxide can be represented by the formula:

wherein A represents a reacted polyepoxide resin and B represents a reacted polyamine. In this formula, the A-B linkage, which is formed by the reaction of an epoxide group with an amine group, can be represented by the formula:

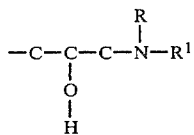

wherein R is an alkylene amine group or hydrogen and $R^1$ is an alkylene amine group.

In preparing the aforenoted epoxy-amine adducts, the polyepoxide resin and the polyamine are reacted under such conditions that the adduct so formed contains about 1 mole of adduct polyamine molecule for each epoxide equivalent originally present in the polyepoxide resin. This polyamine-polyepoxide resin adducting reaction is carried out using about 1 to about 10 moles of polyamine for each epoxide equivalent of the polyepoxide resin. When the reaction is completed, i.e., when all the epoxide groups have reacted, as much of the excess unreacted polyamine as possible is removed. The reaction can also be conducted by reacting the primary amine groups of polyalkylene polyamines, e.g., diethylene triamine, with a ketone to form a ketimine, adducting the secondary amine groups with the polyepoxide resin and then hydrolyzing the ketimine groups to the primary amine groups. The preparation of adducts of polyepoxide resins and polyamines is described in detail in U.S. Pat. Nos. 4,093,594 and 4,116,900 which are hereby incorporated by reference. Adduct formation by ketimine reaction is described in U.S. Pat. No. 3,947,339 which is also incorporated by reference. When the adducting reaction is completed, unreacted amine, if any, is removed by vacuum distillation or by steam sparging under vacuum distillation at temperatures of not greater than about 400° F. If temperatures in excess of 400° F. are employed, the adduct will discolor. Steam sparging is conducted in a manner sufficient to reduce the presence of unreacted amine in the adduct to an amount not greater than about 0.5%, by weight, based on the weight of the adduct. If unreacted amine is present in amounts greater than about 0.5%, the pot life of the mixed system will be reduced substantially and coatings prepared from the compositions after curing may have poor water resistance.

The amine nitrogen equivalent weight of the polyepoxide-polyamine adduct is controlled to be not less than about 140, typically from about 140 to about 2600, preferably from about 175 to about 1250, and most preferably from about 250 to about 850.

The amine hydrogen equivalent weight of the polyepoxide-polyamine adduct will vary from about 140 to about 1700, (e.g., about 140 to about 850) and preferably from about 200 to about 500.

Co-solvent is added to the polyepoxide-polyamine adduct after removal of the reaction medium and unreacted amine. The co-solvent is added in an amount sufficient to achieve a concentration of from about 5 to about 45%, preferably from about 25 to about 40%, by weight, based on the weight of the adduct and co-solvent. The identity of the co-solvent is described hereinafter.

After the addition of the co-solvent the epoxy-amine adduct must be converted to its corresponding acid salt by reaction with acid. Preferably the acid is added after the addition of the co-solvent.

The degree of salting of the epoxy-amine adduct is herein defined to be the number of equivalents of acid reacted with the total number of amine nitrogen equivalents of the epoxy-amine adduct expressed as a percentage of the total number of amine nitrogen equivalents on the adduct. Thus, a 100% degree of salting indicates that the epoxy-amine adduct has been reacted with sufficient acid to convert 100% of the amine nitrogen atoms present in the adduct to the corresponding salt.

To convert the epoxy-amine adduct to its corresponding salt for use in the present invention it is required to react the adduct with sufficient acid to achieve a degree of salting of at least about 10%, and preferably from about 50 to about 200%, and most preferably from about 80 to about 100%. The effect of salting is to render the epoxy-amine adduct soluble in water or at least water dispersible in a microemulsified state. The use of a high percentage of acid, particularly excess acid, helps to lengthen the pot life of the final composition. However, this benefit of longer pot life is achieved at the sacrifice of room temperature curing capability. Since curing above room temperature is normally employed in bottle coating operations, the improvement in pot life is more desirable than a room temperature cure. Thus, the pH of the first component containing the salted epoxy-amine adduct is controlled to be below 7, preferably from about 4 to about 6, and most preferably from about 5 to about 6.

As described above the epoxy-amine adduct is converted to its corresponding salt by mixing with a volatile organic acid. The volatile organic acids may be aliphatic, cycloaliphatic, or heterocyclic and may be saturated or unsaturated. Representative examples of volatile organic acids include acetic acid, formic acid, propionic acid, butyric acid, acrylic acid, methacrylic acid, and cyclohexanoic acid. The organic acid will preferably be an aliphatic mono carboxylic acid having up to 3 carbon atoms.

The preferred acids include a 50/50 (w/w) blend of propionic and formic acids, and most preferably acetic acid.

The epoxy-amine adduct salt and co-solvent are then preferably diluted with water to achieve a total solids content of below about 40%, typically about 15 to about 40%, and preferably from about 20 to about 35% by weight, based on the weight of adduct, co-solvent and water.

Second Component

The second component of the coating system described herein comprises at least three, preferably four basic ingredients namely (1) at least one epoxy crosslinker, (2) at least one reactive silane coupling agent, (3) optionally at least one surfactant, and (4) a suitable co-solvent.

The crosslinker of the second component of the coating system is a low molecular weight water insoluble polyepoxide having more than one terminal epoxide group. Such polyepoxides are the glycidyl polyethers of polyhydric phenols having an epoxide equivalent weight of about 150 to about 1000 and preferably about 180 to about 250.

These polyepoxide crosslinkers include glycidyl polyethers of dihydric phenols made by reacting a dihydric phenol with an epihalohydrin. Examples of such dihydric phenols are p,p'-dihydroxydiphenyl propane (or Bisphenol A as it is commonly called), p,p'-dihydroxydiphenylethane, bis(2-hydroxynaphthyl)methane, 1,5-dihydroxynaphthalene and the like. Bisphenol A is the preferred dihydric phenol. The epoxide equivalent weight of these polyepoxide crosslinkers will vary from about 170 to about 1000, and preferably from about 180 to about 250.

Other suitable polyepoxide crosslinkers are glycidyl polyethers of novolac resins. Novolac resins are phenolic resins obtained by condensing phenol with formaldehyde under acidic conditions and preferably at formaldehyde-phenol molar ratios of 0.5 to 0.8. The corresponding polyepoxides are obtained by reacting an epihalohydrin with the novolac resin. The epoxide equivalent weight of the novolac epoxy resins will vary from about 150 to 300 and preferably from about 170 to 210.

The amount of epoxy crosslinker which is present in the second component and, therefore, in the final coating composition, is most preferably sufficient to achieve substantially stoichiometric equivalence with the reactive amino hydrogens on the epoxy-amine adduct of the first component. In general, it is preferred to employ the epoxy crosslinker in an amount sufficient to achieve a crosslinker epoxy to reactive adduct amine hydrogen equivalent weight ratio of from about 0.25:1.00 to about 1.5:1.0, and, preferably, from about 0.8:1.0 to about 1.2:1.0.

Suitable reactive silanes useful in the second component include those of the structural formula:

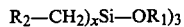

wherein $R_1$ is an alkyl group of from about 1 to about 4 carbons, preferably about 1 to about 2 carbons (e.g., 1 carbon), $R_2$ is an organo functional radical selected from the group consisting of amino, glycidyl, epoxy cycloaliphatic wherein the cycloaliphatic group contains from about 5 to about 7 carbons, preferably 6 carbons, mercapto, ureido, and amino alkylamino wherein the alkyl group contains from about 1 to about 6 carbons, preferably 1 to about 4 carbons (e.g. 2 carbons) and x is an integer of from about 2 to about 5, preferably from about 2 to about 3.

Representative examples of suitable reactive silanes include beta-(3,4-epoxycyclohexyl)-ethyltrimethoxy silane; gammaglycidoxypropyltrimethoxy silane; gamma-mercaptopropyltrimethoxy silane; n-beta-(aminoethyl)gamma-iminopropyltrimethoxysilane; gamma-ureidopropyltrimethoxysilane, and beta-mercaptoethyltriethoxy silane.

The above described silanes are essential for achieving the desired scratch resistance on pristine glass, blush resistance, and adhesion of the coating to the glass container.

The preferred silanes which yield the best scratch and blush resistance are the glycidyl silanes wherein $R_2$ in the above structural formula is a glycidyl group with the most preferred being gamma-glycidoxypropyltrimethoxy silane.

The reactive silanes preferably are present in the second component in amounts which can vary from about 3.5 to about 27%, preferably from about 5 to about 20%, and most preferably from about 7 to about 10%, by weight, based on the weight of the solids content, i.e., non-volatile substituents of the second component, i.e., the epoxy crosslinker, silane and surfactant. Such amounts typically will yield a silane level in the dried coating of from about 1 to about 10%, preferably from about 1 to about 6%, and most preferably from about 2 to about 6%, by weight, of the dried coating.

Suitable surface active agents which can be employed in the composition of this invention can be conveniently classified as anionic, cationic, and non-ionic. These surface active agents are generally characterized structurally by an elongated non-polar portion having but little affinity for water or water-soluble systems and a short polar portion possessing high affinity for water and water-soluble systems. The non-polar portion is hydrophobic and the polar portion is hydrophilic.

If the elongated, non-polar portion of the molecule is included in the anion in the aqueous solution, the surfactant is called anionic. In the anionic class, the most commercially important anion groups are carboxy (—COOH), sulfonic acid (—SO$_2$H) and sulfuric ester (—OSO$_3$H).

The cationic or cation active surfactants ionize in water to form a cation containing the elongated non-polar portion. In the cationic class, the most prevalent groups are primary, secondary and tertiary amino groups and the quaternary ammonium groups. Phosphonium and sulfonium groups are occasionally used.

The non-ionic surface active agents do not dissociate in water but nevertheless are characterized by a relatively polar portion and a relatively non-polar portion.

Typical of the anionic surface active agents are the alkali metal salts of the sulfate esters of C$_8$ to C$_{20}$ fatty alcohols and alkali metal salts of sulfonic acids of C$_{12}$ to C$_{20}$ aliphatic hydrocarbons. Ammonium and alkali metal soaps of C$_{10}$ or higher saturated and unsaturated fatty acids may be used such as potassium oleate and sodium stearate.

Typical non-ionic surface active agents include adducts of ethylene oxide and alcohols such as α-alkyl, α-alkenyl, and α-alkaryl-omega hydroxy-poly(oxylenes) wherein the alkyl, alkenyl, and aralkyl contain from about 8 to about 20 carbons and the ethylene oxide/OH equivalent ratio is about 3–50 mole equivalents. Most preferred surfactants of this group are the polyethoxylated alkyl phenols wherein the alkyl group is as defined above.

An example of a useful cationic dispersant would be a long chain (C$_{18}$ or higher) amine such as dodecylamine hydrochloride or a quaternary amine derivative such as tetradecyl trimethyl amine acetate.

Representative examples of surfactants which are preferred include α-di-sec-butylphenyl-omego-hydroxy-poly(oxyethylene) produced by the condensation of 1 mole of di-sec-butylphenol with an average of 4–14 or 30–50 moles of ethylene oxide wherein the sec-butyl groups are predominantly (90% or more) o-, p-substituents; an α-dodecyl-omego-hydroxy-poly(oxyethylene) mixture of dihydrogen phosphate and monohydrogen phosphate esters that have an acid number (to pH 5.2) of 103–111 and produced by the esterification of the condensation product of 1 mole of n-dodecyl alcohol with 4–4.5 mole of ethylene oxide; an α-(p-dodecylphenyl)-omego-hydroxy-poly(oxyethylene) producted by the condensation of 1 mole of dodecylphenol (the dodecyl group is a propylene tetramer isomer) with an average of 4–14 or 30–50 moles of ethylene oxide; an α-(p-nonylphenyl)-omego-hydroxy-poly(oxyethylene) mixture of dihydrogen phosphate and monohydrogen phosphate esters that have an acid number (to pH 5.2) of 49–59 and that are produced by the esterification of α-(p-nonylphenyl)-omego-hydroxy-poly(oxyethylene) and having an average poly(oxyethylene) content of 5.5–6.5 moles, an α-(p-nonylphenyl)-omego-hydroxy-poly(oxyethylene) mixture of dihydrogen phosphate and monohydrogen phosphate esters that have an acid number (to pH 5.2) of 62–72 and that are produced by the esterification of α-(p-nonylphenyl)-omego-hydroxy-poly(oxyethylene) and having an average poly(oxyethylene) content of 9–10 moles; and α-(p-nonylphenyl)-omego-hydroxypoly(oxyethylene) mixture of dihydrogen phosphate and monohydrogen phosphate esters that have an acid number (to pH 5.2) of 98–110 and that are produced by the esterification of α-(p-nonylphenyl)-omega-hydroxy-poly(oxyethylene) and having an average poly(oxyethylene) content of 45–55 moles; an α-(p-nonylphenyl)-omega-hydroxy-poly(oxyethylene) produced by the condensation of 1 mole of nonylphenol (nonyl group is a propylene trimer isomer) with an average of 4–14 or 30–50 moles of ethylene oxide (these materials are commercially available under a series of surfactants known under the tradenames Terigitol TM, and Igepal TM and are the most preferred surfactants); an α-(p-nonylphenyl)-omega-hydroxy-poly(oxyethylene) sulfate ammonium or sodium salt, the nonyl group being a propylene trimer isomer and the poly(oxyethylene) content averaging about 4 moles; poly[(methylene-p-nonylphenoxy) poly(oxypropylene) (4–12 moles) propanol] having a minimum molecular weight of about 3500; the polysorbate series of surfactants such as polysorbate 20 (polyoxyethylene sorbitan monolaurate) meeting the following specifications: saponification number 40–50, acid number 0–2, hydroxyl number 60–108, and oxyethylene content 70–74%; polysorbate 40 (polyoxyethylene sorbitan monopalmitate) meeting the following specifications: saponification number 41–52, oxyethylene content 66–70.5%; and polysorbate 85 (polyoxyethylene sorbitan trioleate) meeting the following specifications: saponification number 80–95, and oxyethylene content 46–50%.

The surfactants function to substantially improve the labelability of the coating and the blush resistance of the same. A surfactant is considered to be system compatible when it is non-reactive with the other ingredients of the mixed composition and does not adversely influence the stability of the emulsion present therein.

The surfactants are present in the second component in amounts which can vary from about 0 to about 26%, preferably from about 8.0 to about 20% (e.g. 3%), by weight, based on the weight of the non-volatile substituents (i.e. solids content) of the second component (i.e., the epoxy crosslinker, surfactant and reactive silane). Such amounts will typically yield a surfactant level in the dried coating of from about 2 to about 8%, preferably from about 2 to about 6%, by weight, based on the dry coating weight.

As described hereinafter, it is a requirement of the present invention that the surfactant must be present in the mixed final formulation in requisite amounts and all or part of the same can be initially present in either the second or third components prior to mixing.

The aforedescribed ingredients of the second component are preferably mixed with an appropriate non-reactive co-solvent as defined herein to reduce the viscosity of the epoxy-crosslinker and prepare it and the other ingredients of the second component for mixing with the salted epoxy-amine adduct of the first component.

The co-solvent will typically be present in the second component in an amount which can vary from about 0 to about 90% (e.g. 5 to 30%), and preferably from about 75 to about 80%, by weight based on the weight of co-solvent and epoxy crosslinker.

The co-solvent which can be employed in either the first or second component is herein defined to be an organic aliphatic hydroxyl containing solvent which is characterized as possessing a specifically defined solubility parameter polar component ($\delta_p$) in units of $(cal/cm^3)^{\frac{1}{2}}$ of from about 2.6 to about 3.9 and preferably from about 2.8 to about 3.6. The organic aliphatic hydroxyl containing solvent is referred to herein as a co-solvent because it is partially water soluble and therefore serves as a bridge between the water soluble phase (i.e., the epoxy amine adduct) and the water insoluble phase (i.e., the epoxy crosslinker) of the coating composition.

The solubility parameter polar component of a solvent is determined from the following equation:

$$\delta_p = \sqrt{\frac{12108 \, (\epsilon - 1)}{V_m^2 \, 2 + n_D} (n_D + 2) \, u^3 \frac{cal}{cm^3}}$$

wherein $\epsilon$ = dielectric constant, static value, of the co-solvent;

$n_D$ = the index of refraction for the sodium-D line of the co-solvent;

u = dipole moment, Debyes of the co-solvent;

$V_m$ = molar volumn(cm$^3$) of the co-solvent.

For a further discussion of polar solubility parameters see M. Hansen and K. Skaarup; *Independent calculation of The Parameter Components* 39 journal of Paint Technology No. 511 (1967), the disclosure of which is herein incorporated by reference.

Thus, any organic aliphatic hydroxyl containing co-solvent having a solubility parameter polar component within the above ranges may be employed in preparing the first two components of the coating system described herein. Typical co-solvents are alcohols and glycol ethers.

In addition to the hydroxyl containing co-solvents, minor amounts of other solvents, e.g., other alcohols, glycolethers, ketones, organic carbonates, aromatic hydrocarbons, cyclic ethers and the like, can be included in a co-solvent blend, providing the polar solubility parameters of the blend meet the aforestated range.

Representative examples of suitable alcohols and their associated solubility parameters polar component in (cal/cm$^3$)$^{\frac{1}{2}}$ include n-propanol (3.3) and n-butanol (2.8).

Representative examples of suitable glycol ethers and their associated solubility parameters polar component include ethylene glycol monopropylether (3.6); diethylene glycol monobutyl ether (3.4); and ethylene glycol monobutyl ether (3.1).

The solids content of the second component, i.e. percent non-volatiles of crosslinker, silane and surfactant, will generally vary from about 10 to about 100%, preferably from about 20 to about 40%, and most preferably from about 22 to about 26%, by weight, based on the total weight thereof.

Third Component

The identity of the third component of the formulation described herein will depend on the properties sought to be imparted to the ultimate coating.

For example, the third component can comprise an aqueous emulsion or dispersion of a system compatible wax.

More specifically, the waxes of the third component of the subject formulation in general, are solids at temperatures of at least 100° F., are hydrophobic and are insoluble in water, but can be dispersed with the help of surface active agents. Such materials have been found to be essential for imparting both improved scratch resistance and lubricity to the ultimate coating described herein.

Representative examples of such material include natural and synthetic waxes. Illustrative of natural waxes include beeswax, spermacetic wax carnauba wax, Japan wax, palm wax, hydrogenated castor oil and the like; high molecular weight acids and alcohols, containing at least about 11 carbons such as ceratic acid, lauric acid, montanic acid, palmitic acid, cetyl alcohol, ceryl alcohol, and stearyl alcohol.

Illustrative synthetic waxes include esters of polyhydric alcohols including the steric esters of ethylene glycol, diethylene glycol, polyethylene glycol and sorbital, the mono-, di-, and tristearates of glycerol; paraffin type waxes such as those prepared by the Fisher-Tropsh process as well as the oxidized and esterified derivatives thereof; low molecular weight (e.g. between 1000 and 20,000 mw) polyethylene and partially oxidized derivatives thereof (see for example U.S. Pat. No. 2,995,533 the disclosure of which is herein incorporated by reference); amides of higher fatty acids such as stearamides; and wax blends.

It is to be understood that it is believed any of the aforenoted waxes will improve scratch resistance and lubricity of the coating, give acceptable blush resistance thereof and can therefore be employed where said properties are sought to be imparted to the same.

However, it is a further feature of the present invention that not only can improvements in scratch resistance, blush resistance, and lubricity, be achieved but also a simultaneous improvement in label adhesion is obtainable by employing certain types of polyethylene waxes.

For example, while carnauba wax yields a clear colorless film it substantially reduces label adhesion as do most of the aforedescribed waxes.

More specifically, additional improvements in label adhesion can be achieved by employing as the third component an emulsion of partially oxidized (i.e. having a portion of its unsaturated linkages bound to oxygen atoms), polyethylene wax having a number average molecular weight of less than about 20,000, typically from about 6,000 to about 20,000, and preferably from about 6000 to about 10,000; an acid member of about 14 to about 18, a softening point of about 254° F. (ASTM D E-28), and a density of greater than about 0.95 gm/cc, and as high as technically possible, preferably from about 0.96 to about 0.965 gm/cc.

The acid number is a term used in the analysis of waxes and fats to designate the number of milligrams of potassium hydroxide required to neutralize the free fatty acids in one gram of substance. The determination is performed by titrating an alcoholic solution of the material with a tenth or half-normal alkali using phenolphthalein as indicator.

It is believed that the ability of the aforedescribed polyethylene wax to improve label adhesion is particularly dependent on the density thereof, since other polyethylene waxes which have densities below about 0.95 gm/cc do not achieve this improvement.

A polyethylene wax possessing the above described properties is available from Allied Chemical Corp. under the Trade name AC316 TM.

An emulsion of the aforedescribed polyethylene wax is available commercially from Chemical Corporation of America under the Tradename Chem Cor 316N30 TM. This commercial material employs a non-ionic surfactant of polyethoxylated alkyl phenol (e.g., Igepal 630 TM or Igepal 530 TM) to emulsify AC316 TM in water.

As mentioned above, the aforenoted waxes employed in the third component are employed in the formulation in emulsified form. Accordingly, surface active agents are employed to achieve emulsification of the same. Suitable surfactants must be compatible with the mixture of components 1 and 2 and include those mentioned in connection with the second component.

It is to be understood that the surfactant is present in the wax emulsion in at least an amount sufficient to emulsify the wax. However, higher amounts of surfactant can be employed, where the third component is the vehicle for all or part of the surfactant ordinarily employed in the second component. In short, the surfactant necessary to impart the described label adhesion and blush resistance can be located initially in the second and/or third components described herein.

In carrying out the coating process using the aforedescribed formulation, the first component containing the salted epoxy-amine adduct is mixed with an appropriate amount of the second component and this mixture is then added to the third component.

If the first component is added to the third component, an insoluble gel can form resulting from the contact of two oppositely charged polyelectrolytes, e.g., the amine function of the salted epoxy-amine adduct and the carboxyl group of the partially oxidized polyethylene wax. Consequently this procedure is to be avoided.

Accordingly, when components I and II described above have been properly prepared, they are mixed together with simple stirring. Immediately, upon mixing, the mixture becomes opaque, creamy and viscous. However, within about two minutes with continuous stirring, the mixture becomes translucent or transparent as a microemulsion forms.

The term microemulsion as employed herein defines certain colloidal solutions which have the appearance of true solutions but which exhibit the light scattering Tyndall beam effect. Microemulsions also encompass hazy and cloudy dispersions which exhibit opalescence, indicating that at least a portion of the particles have a particle size of less than 0.14 microns. As described in the aforenoted Shimp et al U.S. Patent Application, and without wishing to be bound by any particular theory, it is believed that the polar portion of the co-solvent is oriented towards the continuous aqueous phase while the non-polar portion of the co-solvent is oriented towards the discontinuous non-polar phase (the epoxy crosslinker) to form micelles. The formation of the micelles is aided by the salted epoxy-amine adduct which functions as a surfactant. The particle size of the epoxy crosslinker as dispersed in the form of an oil-in-water type microemulsion is typically less than 0.14 microns.

When components I and II are mixed, the resultant viscosity is usually greater than that of either component alone due to microemulsion formation. Consequently, the resulting mixture can be thinned with water to the desired viscosity for mixing with component III. Optionally, co-solvent can be used in conjunction with water for viscosity adjustment.

Thus, the total amount of co-solvent employed in the mixture of components I and II is generally controlled to be at least 15%, typically from about 20 to about 45%, and preferably from about 25 to about 40% by weight, based on the weight of the adduct, crosslinker, reactive silane, co-solvent, water, and surfactant, by the addition of further co-solvent if needed.

The solids content of the mixture resulting from the mixing of components I and II and just prior to mixing with component III is preferably controlled, by dilution with water, to be from about 15 to about 25%, preferably from about 20 to about 25%, (e.g. about 13%) by weight, based on the weight of the mixture, i.e., adduct, crosslinker, co-solvent, silane, surfactant, and water.

Generally components I and II are mixed at a weight ratio of from about 3:1 to about 1:1.5, and preferably from about 2:1 to about 1:1, respectively, although the specific ratio selected will depend on the ultimate amounts of each ingredient of each component sought to be present in the final formulation.

The mixture of components I and II is then added to component III. Prior to the addition of components I and II to component III, the latter (e.g., component III) is diluted with water and/or co-solvent to impart the desired application viscosity to the three component mixture. Generally, sufficient water and/or co-solvent is added to component III so that the three components when mixed will have a solids content not greater than about 5%, typically from about 0.1 to about 5.0%, and preferably from about 0.25 to about 0.6%.

The final mixture of components I, II, and III, is believed to contain a mixture of the microemulsified crosslinker particles obtained by mixing components I and II, and the emulsified particles of the wax derived from the third component. Thus, the discontinuous phase of the final resulting emulsion is heterogeneous in nature, it being a mixture of emulsified particles of crosslinker and wax. The continuous phase contains the water with the silane dissolved therein. The surfactant of the second component, if water soluble, and co-solvent will likely be oriented at the interface of the two phase system. If the surfactant is not water soluble it will be dispersed in the non-aqueous phase.

Regardless of the particular solids content of the emulsion mixture, the composition of said solids content will preferably comprise from about 25 to about 80%, preferably from about 55 to about 75%, and most preferably from about 55 to about 70%, by weight, based on the total solids weight, of the salted epoxy-amine adduct; epoxy crosslinker in an amount sufficient to attain the aforedescribed epoxy to reactive adduct amine, equivalent weight ratios; surfactant in an amount of from about 1 to about 10%, and most preferably from about 3 to about 6%, by weight, based on the total solids weight; reactive silane in an amount of from about 0.5 to about 10%, preferably from about 1 to about 3%, and most preferably from about 2.5 to about 3%, by weight, based on the total solids weight; and wax in an amount of from about 1 to about 50%, preferably from about 7 to about 35%, and most preferably from about 25 to about 35%, by weight, based on the total solids weight. The amount of co-solvent in the final formulation will be effective to maintain the epoxy crosslinker in microemulsified form as herein described. Such amounts typically will vary from about 0.5 to about 6.0%, preferably from about 1 to about 2.5% and most preferably from about 1.5 to about 2.0%, by weight, based on the weight of the mixed composition containing components I, II and III.

The aqueous based emulsion containing the mixture of components I, II and III, is applied to the glass surface by any useful technique although spraying is the preferred technique.

Techniques used for spraying are well known in the art. The essential consideration of spraying is the complete and even coverage of glass surfaces being treated. Airless sprays impelled by hydraulic pressure can be used for this process. Also effective are sprays impelled as fine droplets by released compressed air. Sprays for either of these methods need to be dilute in terms of the useful compounds they carry so that the necessary complete and even coverage of the glass is attained on the immediately contacted surface.

After the coating has been applied to the glass surface the reactive components present therein are allowed to cure. The specific curing temperature will depend on such variables as the reactive silane type and amount, epoxy-amine adduct molecular weight, composition of the amine termination and degree of salting of the adduct.

During the curing procedure, the alkoxy portions of the silane are converted by hydrolysis to free hydroxyl groups which react with the glass surface. The reactive $R_1$ functional groups on the other end of the silane molecule react with the crosslinked product of the epoxy-amine adduct and the epoxy crosslinker which also forms during curing. Some reaction between the polyethylene and the crosslinker epoxy-amine adduct structure may also occur. The co-solvent and water are evaporated during cure and do not form any part of the cured coating.

It is an advantage of the aforedescribed formulation that curing can occur at relately low temperatures of not greater than about 250° F., typically from about 160° to about 250° F. At cure temperatures greater than about 250° F. the label adhesion properties of the coating are substantially reduced.

In view of the above, one way to achieve effective curing of a coating applied to glass bottles is to conduct the coating process while the bottles are at the appropriate curing temperature immediately after annealing.

More specifically, in the manufacture of glass bottles, a melt of the glass is blow formed into bottles, one at a time, at close to the melting point of the glass, e.g., about 1000° F. The individual bottles are moved away from the blow forming operation into an array of bottles in the stand-up position. This array is then moved through a cooling lehr and leaves the same at a temperature of about 400° F. Beyond this point the array is allowed to cool in the surrounding atmosphere. Consequently, it is desirable to apply the coating after the bottles leave the cooling lehr and at a time when they have cooled down to the appropriate curing temperature. This permits using the retained heat of formation as the heat source for curing.

In order to impart the aforedescribed properties to the glass surface, the coating thickness will generally be controlled to be from about 0.1 to about 0.5 microns, and preferably from about 0.2 to about 0.3 microns in thickness.

The amount of the coating applied will vary with the treating time and will, in combination with the concentration of the non-volatile reactive constituents in the emulsion be proportional to the product of these factors. However, the emulsion should not be applied to the extent that it runs down the glass.

A spray rate of from about 3 to about 7 gallons per hour is generally employed for compositions containing the aforedescribed solids content.

The resulting coating is tightly adhered to the glass surface and imparts the aforenoted properties to the same.

The coating formulations described herein possess many processing advantages in that they are water based, exhibit relatively good stability, and cure at relatively low temperatures (therefore they do not need a separate baking step) and within short periods of time, e.g. less than three minutes, to the extent that the desired scratch resistance and lubricity are imparted to the glass surfaces at the requisite stage during the bottle forming procedure.

More specifically, component I is typically stable for periods up to about six months at room temperature and at 120° F. The stability of component II is related to the type of silane employed. For example, component II when containing glycidyl functional silane exhibits good stability for periods of up to about six months at room temperature and 120° F. However when amino functional silanes are employed therein the stability is reduced to about four weeks at room temperature.

The stability of the mixed system is expressed in terms of its pot life.

The pot life of the coating composition is herein defined to be the lapsed time for mixing the three components together until the resulting composition is no longer suitable for application by spray or roll coating techniques to a substrate or until the properties obtainable from the cured coating are no longer acceptable. The suitability for application by spraying or roll coating techniques can be expressed in terms of the viscosity and the homogeneity of the coating composition. Thus, the pot life can be characterized as the lapsed time from mixing the two components to the time where the viscosity of coating compositions increases above U as determined by the Gardner-Holdt method at 25° C. or develops sediment or stratification.

Typically the microemulsion phase separates, in which case the crosslinker settles into a separate layer which may be accompanied by some reduction in viscosity.

The mixed system preferably exhibits a pot life of about 7 days at room temperature. This pot life is lowered to about 10 to 18 hours when amino functional silanes are employed.

The properties which the cured coating can be made to exhibit as described above include scratch resistance, lubricity, blush resistance and label adhesion.

Scratch resistance is measured on a static load tester manufactured by Ericison Corp. The device slides the surfaces of two bottles together at 45 degree angles under constant load at a rate of four inches per minute. Load settings can be varied from 17 to 100 pounds. The bottles pass at a particular load setting if no nicks are seen in the area of test. Bottles are tested both wet and dry. In the wet test the contact area is wetted with a constant stream of water during the test. It has been found that there is a time dependence or induction period associated with test scratch resistance. This induction period is estimated to be about 24 hours or less to achieve maximum wet scratch resistance. The induction period for wet scratch resistance can be minimized, however, by controlling the degree of salting of the epoxy-amine adduct to be about 100%.

The induction period for wet scratch resistance is not disadvantageous in most applications since wet scratch resistance is not needed until the bottles are filled. The resulting coating is considered to be scratch resistant when it passes the dry scratch test under an applied load of at least 50 lbs.

Lubricity is expressed in terms of slip angle. Slip angle is measured on a motorized tilting table. Three coated bottles are arranged in a pyramid on their sides on the table. The two bottom bottles are held in place and the third allowed to move. The table is tilted at a slow constant rate until the top bottle slips approximately one inch. This angle at the point of slippage between the plane of the bottom two bottles and horizontal is measured and recorded as the slip angle. The resulting coating is considered to be lubricious when a test bottle exhibits a slip angle of not greater than about 20°.

Blush resistance is determined by placing coated bottles in a 180° F. water bath for ten minutes. The amount of blush (haziness of the coating) is rated on a scale of one to ten. A rating of one indicates complete blush while a rating of ten indicates no blush. Typically an induction period must be allowed to transpire before the full extent of the blush resistance is observed. The induction period will vary with the amount and type of silane employed and the molecular weight and composition of the amine termination of the adduct. Generally, the higher the level of the silane the shorter the induction time. Similarly, increasing the functionality of the amine reduces the induction time while increasing the molecular weight of the epoxy-amine adduct increases the induction period. The resulting coating is considered to be blush resistant when it exhibits a blush resistance value of at least 8 after an induction period of at least 24 hrs.

Generally the induction period to achieve maximum blush resistance can vary from about 24 to about 72 hours.

Label adhesion is evaluated using four label adhesives which include Borden EA4097, a caesin based adhesive; National Starch B-6710, a dextrine based adhesive; Fuller K1111, a jelly gum based adhesive; and Findley 245-326, a modified dextrine adhesive. The adhesives are applied to label stock using a #16 Meyer bar and affixed to the coated bottle using light pressure. Adhesion is checked after 24 hours at room temperature by peeling the label off. Adhesion is rated on a scale of one to ten depending on the amount of label remaining on the bottle. A rating of one indicates no adhesion while a rating of ten indicates complete fiber tear which indicates excellent adhesion.

The invention is additionally illustrated in connection with the following examples which are to be considered as illustrative of the present invention. It should be understood, however, that the invention is not limited to the specific details of the examples. All parts and percentages in the examples as well as the remainder of the specification are by weight unless otherwise specified.

EXAMPLE 1

I. Preparation of Component I

Part A

To a suitable reactor are added 1600 parts of the diglycidyl ether of Bisphenol A having an epoxide equivalent weight (WPE) of 190. Stirring and heat are applied raising the temperature to 70° C. Bisphenol A, 804 parts, are added followed by the addition of 2.42 parts of triphenyl phosphine. Heating is continued, and when the temperature reaches 130° C., the heating source is removed. The exothermic reaction carries the temperature to 160° C. The temperature is maintained at 160° C. until the exothermic reaction is completed. The temperature is then raised to 180° C. and maintained thereat for two hours. The resulting resinous epoxy resin has an epoxide equivalent weight of 1600.

Part B

Preparation of Epoxy-amine Adduct

To a suitable reactor are added 300 parts of the epoxy resin prepared in Part A and 250 parts of toluene. Heating and stirring are applied to dissolve the resin in the solvent. After solution is attained and with the temperature at 70° C., 64 parts of ethylene diamine are added. The temperature is held at 65°-70° C. for one hour, followed by heating to 100° C. and holding at this temperature for one hour. The reactor is then fitted for distillation and heat is applied raising the temperature to 180° C. while distilling solvent and excess ethylene diamine. After the temperature reaches 180° C., a vacuum of 28.5 inches of Hg is applied, the temperature is brought back to 180° C. and is held at this temperature for 15 minutes. The vacuum is then released, the heat source is removed, and the reactor is fitted with a reflux condenser. The calculated molecular weight of the adduct is about 3320, the amine nitrogen equivalent weight is 830 and the amine hydrogen equivalent weight is 553 based on adduct solids.

Part C

Preparation of Adduct Salt

To a suitable reactor are added 20 parts of the epoxy-amine adduct described in Part B and 5 parts of the monobutylether of ethylene glycol. 1.94 parts of propionic acid and 1.25 parts of formic acid are then added with stirring to achieve a degree of salting of 100% followed by slow addition of 71.8 parts of deionized water. Stirring is continued until solution is attained. The resulting aqueous solution has a solids content of 20%, a Gardner-Holdt viscosity at 25° C. of $A_1$, and a pH of 5.6.

II. Preparation of Component II 12.3 parts of the diglycidyl ether of Bisphenol A, having an epoxide equivalent weight of 190 is dissolved in 85.1 parts of ethylene glycol monobutyl ether. To the resulting solution is added 0.87 parts of gamma-glycidoxypropyltrimethoxy silane, and 1.74 parts of a polyethoxylated alkylphenol surfactant available under the trade name Tergitol 12-P-6 from Union Carbide. This surfactant is $\alpha,\gamma$-dodecyl-omega hydroxy poly(oxyethylene) derived using 6 moles of ethylene oxide.

The resulting solution has a solids content of about 14.9% based on the non-volatile constituents present therein.

III. Preparation of Component III 40 parts of melted partially oxidized polyethylene having a number average molecular weight of about 8,000, an acid number of about 14 to 18 and a density of about 0.96 gm/cc available from Allied Chemical Corp. under the trade name AC316 TM, is emulsified in water using a mixture of surfactants.

More specifically, the following six ingredients are stirred into a pressure reactor in the indicated amounts:

|  | Parts by Weight (p.b.w.) |
| --- | --- |
| (1) AC316 TM | 40.0 |
| (2) Igepal CO-630 TM * | 5.0 |
| (3) Igepal CO-530 TM ** | 5.0 |
| (4) KOH (90% Flake) | 0.6 |
| (5) Sodium Meta Bisulfite | 0.4 |
| (6) Water to 50% solids | 50 |

*Igepal CO-630 TM is an $\alpha$-(p-nonylphenyl)-omega hydroxypoly(oxyethylene) prepared using 9 moles of ethylene oxide.
**Igepal CO-530 TM is the same as Igepal CO-630 TM with the exception that it is derived using 6 moles of ethylene oxide. Both Igepal TM CO-630 & 530 are available from GAF Corporation.

The above six ingredients are heated to 95° C. with the vent open. The vent is then closed and the contents of the reactor are heated to 150° C. for 0.5 hr. Additional water is added to bring the solids to 35% (i.e. 43 p.b.w.) followed by the addition of 0.4 p.b.w. of an aqueous solution of 90% KOH (flake) while the temperature of the reactor contents are maintained at 150° C. The reactor contents are then cooled to room temperature with agitation as quickly as possible. 500 ppm of formaldehyde are added as a preservative. The resulting emulsion, 1.71 parts, is diluted with 98.3 parts of deionized water to yield an emulsion containing 0.5%, by weight, polyethylene, based on the emulsion weight.

IV. Preparation of Final Formulation

Part A 39.0 parts of component I, from Part C, are mixed with 61.0 parts of component II. The resulting mixture, which has a solids content of 13.1%, immediately becomes opaque, creamy and viscous. However, within two minutes with continuous stirring, the mixture becomes translucent and almost clear. The epoxy crosslinker and epoxy-amine adduct are present in said mixture in amounts sufficient to achieve an epoxy to amine hydrogen equivalent weight ratio of 1:1.

Part B 8.4 parts of the microemulsion of Part A is mixed with 91.6 parts of the emulsion of component III. The final formulation has a solids content of about 1.5%.

Bottle Coating Procedure

Test bottles are first washed with methylethylketone and heated in an oven to 220° F. until they have equilibrated (at least 30 minutes). The bottles are then removed from the oven and immediately coated using a passche AUJ-S spray gun equipped with an AF-3 nozzle, set for a fan pattern and siphon feed using 38-40 psi air pressure. The test bottles were coated with the mixed final formulation on a turntable turning at approximately 60 rpm for 10 revolutions at a distance of 6 to 8 inches. This gives a film thickness of about 2300 Å as measured by standard SEM techniques.

The coated bottles are then tested for wet and dry scratch resistance, slip angle, label adhesion, and blush resistance as described herein. The results are summarized at Table I as run 1.

Bottles coated with a control formulation are also tested. The control formulation is prepared by mixing component I with component II with the exception that component II in this instance lacks the silane and the surfactant. The results are summarized at Table I as run 2.

As may be seen from the results of Table I all of the properties of the coating of run 1 were superior to those of the control.

EXAMPLE 2

This Example is conducted to illustrate the effect of the presence of a surfactant in the final formulation on blush resistance and label adhesion.

Accordingly, the three component formulation described in Example 1 is prepared with the exception that the amount and identity of surfactant added to the second component is varied such that the percent thereof in the total solids content of the final formulation varies from 0 to 10%.

Glass bottles are then coated with the resulting formulations in accordance with Example 1 and tested in accordance with the same. The results are summarized in Table II.

As may be seen from the results of Table II, the surfactant substantially improves the label adhesion properties of the coatings in amounts of at least 1% and the performance of the surfactant appears to remain constant up to levels of about 10%. The surfactant also substantially improves blush resistance at levels of at least 3%. Furthermore, those formulations which lacked any surfactant exhibited inferior blush resistance and label adhesion.

TABLE II

| Run No. | Amount of Surfactant (%) | Surfactant Type | Wet* Scratch Resistance After 24 hrs | Slip Angle (degrees) | Label Adhesion Using Jelly Gum Based Adhesive | Blush Resistance After 24 hrs. |
|---|---|---|---|---|---|---|
| 1 | 0.0 | A | 100 | 12 | 2 | 7 |
| 2 | 1.0 | A | 100 | 12 | 7 | 8 |
| 3 | 3.0 | A | 100 | 12 | 6 | 9 |
| 4 | 6.0 | A | 100 | 12 | 5 | 9 |
| 5 | 10.0 | A | 100 | 13 | 7 | 9 |
| 6 | 0.0 | B | 100 | 12 | 1 | 6 |
| 7 | 1.0 | B | 100 | 12 | 2 | 8 |
| 8 | 3.0 | B | 100 | 11 | 5 | 10 |
| 9 | 6.0 | B | 100 | 11 | 4 | 10 |
| 10 | 10.0 | B | 100 | 12 | 5 | 10 |
| 11 | 0.0 | C | 100 | 13 | 0 | 6 |
| 12 | 1.0 | C | 100 | 11 | 4 | 9 |
| 13 | 3.0 | C | 100 | 11 | 5 | 9 |
| 14 | 6.0 | C | 100 | 11 | 4 | 9 |
| 15 | 10.0 | C | 100 | 15 | 5 | 9 |

*results expressed as load setting in lbs which passed.
A = Tergitol 12-P-6 TM
B = Pluronic 25R TM (a poly(oxypropylene)/poly(oxyethylene) block copolymer)
C = Igepal CO630

EXAMPLE 3

This example is conducted to illustrate the effect of the reactive silane on blush resistance of the coating.

Accordingly, the three component formulation described in Example 1 is prepared with the exception that the amount of the silane added to the second component is varied such that the percent thereof in the total solids content of the final formulation ranges from 0 to 8% by weight based on the solids weight.

Glass bottles are then coated with the resulting formulation in accordance with Example 1 and tested for blush resistance in accordance with the same with the

TABLE I

| Run No. | Scratch Resistance Wet (after 24 hrs) | Dry | Slip Angle (degrees) | Label Adhesion Caesin Based Adhesives | Dextrine Based Adhesives | Jelly Gum Based Adhesives | Modified Based Adhesives | Blush Resistance (after 24 hrs) |
|---|---|---|---|---|---|---|---|---|
| 1 | 100* | 100* | 13 | 10 | 10 | 5 | 10 | 9 |
| 2 | None | 17* | 30 | 5 | 10 | 0 | 0 | 5 |

*Load Setting in lbs. passed exception that the time from applying the coating to heating the bottles, i.e., induction time, is varied. The results are summarized at Table III.

As can be seen from the data of Table III the higher the amount of silane employed up to 8%, the shorter the induction time and the better the blush resistance. Furthermore, formulations with no silane exhibit inferior blush resistance.

TABLE III

| Run No. | Amount of Silane (%) | Induction Time (hrs) | Blush Resistance |
|---|---|---|---|
| 1 | 0.0 | 15 | 2 |
| 2 | 0.0 | 30 | 3 |
| 3 | 0.0 | 40 | 4 |
| 4 | 0.0 | 60 | 5 |
| 5 | 0.0 | 90 | 5 |
| 6 | 1.0 | 10 | 2.5 |
| 7 | 1.0 | 20 | 5.0 |
| 8 | 1.0 | 30 | 6.0 |
| 9 | 1.0 | 60 | 7.0 |
| 10 | 1.0 | 90 | 7.0 |
| 11 | 3.0 | 2 | 2.0 |
| 12 | 3.0 | 25 | 7.0 |
| 13 | 3.0 | 40 | 8.0 |
| 14 | 8.0 | 5 | 5.0 |
| 15 | 8.0 | 15 | 9.0 |
| 16 | 8.0 | 40 | 10.0 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A multi composition which when the components are mixed forms a thermosetting curable composition capable of rendering glass surfaces scratch resistant, blush resistant and lubricious when applied as a coating on said glass surfaces which comprises:

(A) as a first component, the solution of:
(1) an acid salt of a polyamine terminated polyepoxide adduct which is the reaction product of
(a) a polyepoxide resin represented by the structural formula:

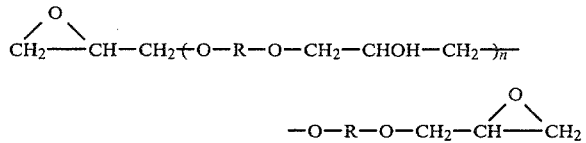

wherein R is a divalent hydrocarbon radical of a dihydric phenol and the average value of n is from about 2 to about 35 and (b) a polyamine having at least two amine nitrogen atoms per molecule, at least three reactive amine hydrogen atoms per molecule and no other groups reactive with epoxide groups, wherein about 1 mol of (b) is reacted with each epoxide equivalent of (a), said adduct having an active amine hydrogen equivalent weight of about 140 to about 1700 and an amine nitrogen equivalent weight of about 140 to about 2600;

(2) at least one organic aliphatic hydroxyl containing co-solvent having a solubility parameter polar component between about 2.6 and about 3.9 $(cal/cm^3)^{\frac{1}{2}}$ present in an amount of from about 5 to about 45% by weight based on the weight of the polyepoxide-amine adduct and co-solvent; and (3) water in an amount sufficient to bring the solids content of the mixture to below 40% by weight, based on the weight of adduct, co-solvent and water;

(B) as a second component the mixture of:
(1) at least one polyepoxide crosslinker which is the glycidyl polyether of a polyhydric phenol having an epoxide equivalent weight of from about 150 to about 1000;
(2) at least one silane represented by the structural formula:

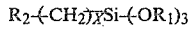

wherein $R_1$ is an alkyl group of from about 1 to about 4 carbons; $R_2$ is an organo functional radical selected from the group consisting of amino, glycidyl, epoxy cycloaliphatic wherein the cycloaliphatic group contains from about 5 to about 7 carbons, mercapto, ureido, amino alkylimino wherein the alkyl group contains from about 1 to about 6 carbons; and x is an integer of from about 2 to about 5;

(3) at least one surface active agent selected from the group consisting of anionic, non-ionic and cationic characterized by their compatibility with the mixed components of the system; and (4) optionally at least one co-solvent of the type employed in the first component in an amount of from about 0 to about 90%, by weight, based on the weight of co-solvent and crosslinker; and (C) as a third component an aqueous emulsion of at least one system compatible natural or synthetic wax emulsified in water with at least one system compatible surfactant of the type employed in the second component, said surfactant and water being present in the third component in at least an amount sufficient to emulsify said wax; and wherein the amounts of said polyepoxide crosslinker, and silane, present in the second component, the amount of said wax present in the third component, and the combined amount of surface active agent present in the second and third components are such that when the three components of the system are mixed the solids content of said mixture thereof contains (i) the polyepoxide crosslinker in an amount sufficient to achieve an epoxy crosslinker to reactive adduct amine hydrogen equivalent weight ratio of from about 0.25:1.0 to about 1.5:1.0; (ii) the silane in an amount of from about 0.5 to about 10%, by weight, based on the weight of said solids content; (iii) the wax in an amount of from about 1 to about 50%, by weight, based on the weight of said solids content; and (iii) the surface active agent in an amount of from about 1 to about 10%, by weight, based on the weight of said solids content.

2. A thermosetting curable coating composition capable of rendering glass surfaces scratch resistant, blush resistant and lubricious when applied as a coating on said glass surfaces which comprises in admixture:

(1) an acid salt of a polyamine terminated polyepoxide adduct which is the reaction product of
(a) a polyepoxide resin represented by the structural formula:

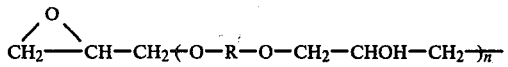

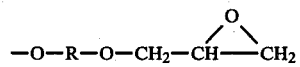

wherein R is a divalent hydrocarbon radical of a dihydric phenol and the average value of n is from about 2 to about 35 and (b) a polyamine having at least two amine nitrogen atoms per molecule, at least three reactive amine hydrogen atoms per molecule and no other groups reactive with epoxide groups, wherein about 1 mol of (b) is reacted with each epoxide equivalent of (a), said adduct having an active amine hydrogen equivalent weight of about 140 to about 1700 and an amine nitrogen equivalent weight of about 140 to about 2600;

(2) at least one polyepoxide crosslinker which is the glycidyl polyether of a polyhydric phenol having an epoxide equivalent weight of from about 150 to about 1000;

(3) at least one silane represented by the structural formula:

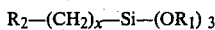

wherein $R_1$ is an alkyl group of from about 1 to about 4 carbons; $R_2$ is an organo functional radical selected from the group consisting of amino, glycidyl, epoxy cycloaliphatic wherein the cycloaliphatic group contains from about 5 to about 7 carbons, mercapto, ureido, amino alkylimino wherein the alkyl group contains from about 1 to about 6 carbons; and x is an integer of from about 2 to about 5;

(4) at least one surface active agent selected from the group consisting of anionic, non-ionic, and cationic characterized by compatibility with the remainder of the ingredients of the composition;

(5) at least one natural or synthetic wax characterized by compatiblity with the remainder of the ingredients of the composition;

(6) at least one organic aliphatic hydroxyl containing co-solvent having a solubility parameter polar component between about 2.6 and about 3.9 (cal/cm$^3$)$^{\frac{1}{2}}$ present in an amount of from about 0.5 to about 6%, by weight, based on the weight of the composition; and (7) water in an amount sufficient to bring the solids content of said composition to not greater than about 5% by weight thereof; and wherein (a) the solids of said composition comprise an amount of said epoxy crosslinker and said adduct salt sufficient to provide an epoxy crosslinker to reactive adduct amine hydrogen equivalent weight ratio of from about 0.25:1.0 to about 1.5:1.0; an amount of said silane of from about 0.5 to about 10%, by weight, based on the weight of said solids; an amount of said surface active agent of from about 1 to about 10%, by weight, based on the weight of said solids; and an amount of said wax of from about 1 to about 50%, by weight, based on the weight of said solids; and (b) said crosslinker is present in said composition in the microemulsified state and said wax is present in said composition as emulsified particles.

3. An article of manufacture which comprises a glass container coated on its external surface with a cured composition which renders the glass surface scratch resistant, and lubricious, said cured composition consisting essentially of the reaction product of:

(1) an acid salt of a polyamine terminated polyepoxide adduct which is the reaction product of
(a) a polyepoxide resin represented by the structural formula:

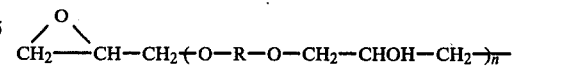

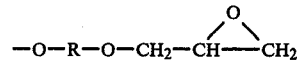

wherein R is a divalent hydrocarbon radical of a dihydric phenol and the average value of n is from about 2 to about 35 and (b) a polyamine having at least two amine nitrogen atoms per molecule, at least three reactive amine hydrogen atoms per molecule and no other groups reactive with epoxide groups, wherein about 1 mol of (b) is reacted with each epoxide equivalent of (a), said adduct having an active amine hydrogen equivalent weight of about 140 to about 1700 and an amine nitrogen equivalent weight of about 140 to about 2600;

(2) at least one polyepoxide crosslinker which is the glycidyl polyether of a polyhydric phenol having an epoxide equivalent weight of from about 150 to about 1000; and (3) at least one silane represented by the structural formula:

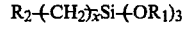

wherein $R_1$ is an alkyl group of from about 1 to about 4 carbons; $R_2$ is an organo functional radical selected from the group consisting of amino, glycidyl, epoxy cycloaliphatic wherein the cycloaliphatic group contains from about 5 to about 7 carbons, mercapto, ureido, amino alkylimino wherein the alkyl group contains from about 1 to about 6 carbons; and x is an integer of from about 2 to about 5; and intimately admixed with said reaction product (a) at least one surface active agent selected from the group consisting of anionic, non-ionic, and cationic; and (b) at least one natural or synthetic wax; and wherein said coating comprises an amount of said epoxy crosslinker and said adduct salt sufficient to provide an epoxy crosslinker to reactive adduct amine hydrogen equivalent weight ratio of from about 0.25:1.0 to about 1.5:1.0; an amount of said silane of from about 0.5 to about 10%, by weight, based on the weight of said coating; an amount of said surface active agent of from about 1 to about 10%, by weight, based on the weight of said coating; and an amount of said wax of from about 1 to about 50%, by weight, based on the weight of said coating.

4. The article of manufacture of claim 3 wherein the glass container is a glass bottle.

5. The composition of claims 1 or 2 wherein R of the recurring structural formula is a divalent radical derived from p,p'-dihydroxydiphenyl propane; the polyamine is an alkylene polyamine having the formula:

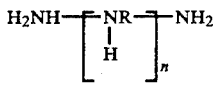

wherein n is an integer from 0 to 4 and R is an alkylene group containing 2 to 4 carbon atoms; the organic co-solvent is selected from the group consisting of alcohols and glycol ethers; the polyepoxide resin crosslinker is derived from the reaction product of epichlorohydrin and p,p'-dihydroxydiphenyl propane; the silane is selected from the group consisting of beta-(3,4-epoxycyclohexyl)-ethyltrimethoxysilane, gamma-glycidoxypropyltrimethoxy silane, gamma-mercaptopropyltrimethoxysilane, n-beta-(amino-ethyl) gamma-iminopropyltriethoxy silane, gamma-ureido propyl trimethoxy silane; and beta-mercaptoethyltrimethoxy silane; the surface active agent is a polyethoxylated alkyl phenol and the wax is selected from the group consisting of beeswax, spermaceti wax, carnauba wax, Japan wax, palm wax, hydrogenated castor oil, high molecular weight acids and alcohols containing at least about 11 carbons, esters of polyhydric alcohols, paraffin waxes, partially oxidized polyethylene having a molecular weight between about 1000 and 20,000 and mixtures thereof.

6. The composition of claim 5 wherein n of the recurring polyepoxide resin structural formula has an average value of from about 4.5 to about 6.5; the alkylene polyamine is an ethylene polyamine; the degree of salting of the adduct is from about 50 to about 200%, the active hydrogen amine equivalent weight of the adduct is from about 200 to about 500; the amine nitrogen equivalent weight of the adduct is from about 250 to about 850; the co-solvent, when present, is selected from at least one member of the group consisting of t-butanol, n-propanol, n-butanol, ethylene glycol monopropylether, diethylene glycol monobutylether, ethylene glycol monobutylether, propylene glycol monopropylether and propylene glycol monobutylether; the amount of the polyepoxide crosslinker is sufficient to achieve an epoxy to reactive adduct amine hydrogen equivalent weight ratio of from about 0.8:1.0 to about 1.2:1.0; the silane is gamma-glycidoxypropyltrimethoxy silane and the wax is partially oxidized polyethylene having a number average of greater than about 0.95 gm/cc, and an acid number of from 14 to 18.

7. The composition of claim 6 wherein the co-solvent, when present, is ethylene-glycol monobutyl ether and the adduct is a salt derived from reaction with a mixture of formic and propionic acid.

8. The composition of claims 1 or 2 wherein said wax is partially oxidized polyethylene having a number average molecular weight of from about 6,000 to about 10,000, an acid number of from about 14 to about 18, and a density of greater than about 0.95 gm/cc, said wax resulting in an improvement on label adhesion of coatings derived from said composition.

* * * * *

UNITED STATES PATENT AND TRADEMARK OFFICE
CERTIFICATE OF CORRECTION

PATENT NO. : 4,374,879
DATED : Feb. 22, 1983
INVENTOR(S) : Donald R. Roberts et al It is certified that error appears in the above—identified patent and that said Letters Patent is hereby corrected as shown below:

Front page, delete "both of" after "Kritchevsky"
Column 9, line 51, delete $R_2-CH_2)_xSi-OR_1)_3$ & insert $R_2-(CH_2)_x-Si-(OR_1)_3$
        line 59, delete "alkylamino" and insert -- alkylimino --
Column 11, line 13, delete "producted" and insert -- produced --
        lines 2, 7, 13, 17, 21, 23, 27, 30, delete "omego" & insert --omega--
        line 42, delete "Terigitol" and insert -- Tergitol --
Column 13, line 37, insert -- , -- after "spermacetic wax"
Column 16, line 64, delete "relately" and insert -- relatively --
Column 21, line 9, insert -- V. -- before "Bottle"
Column 22, Table II, delete "Pluronic 25R$^{TM}$" and insert -- Pluronic 25R1$^{TM}$ --
Column 23, line 37, insert -- component -- after "multi"
Column 24, line 57, delete "(iii)" and insert -- (iiii) --
Column 27, line 9, in the formula, delete $H_2NH$ and insert $H_2NR$

Signed and Sealed this

Twenty-first Day of June 1983

[SEAL]

Attest:

DONALD J. QUIGG

Attesting Officer      Acting Commissioner of Patents and Trademarks